(12) United States Patent
Stein et al.

(10) Patent No.: US 7,789,530 B2
(45) Date of Patent: Sep. 7, 2010

(54) MULTI-LEVEL MODULAR LIGHT BAR

(75) Inventors: Paul L. Stein, O'Fallon, MO (US); Robert E. Kreutzer, Columbia, IL (US)

(73) Assignee: Code 3, Inc., St. Louis, MO (US)

( * ) Notice: Subject to any disclaimer, the term of this patent is extended or adjusted under 35 U.S.C. 154(b) by 647 days.

(21) Appl. No.: 11/463,534

(22) Filed: Aug. 9, 2006

(65) Prior Publication Data
US 2007/0258239 A1 Nov. 8, 2007

Related U.S. Application Data

(60) Provisional application No. 60/746,246, filed on May 2, 2006.

(51) Int. Cl.
*F21S 4/00* (2006.01)
(52) U.S. Cl. .................. 362/249.14; 362/219; 362/540; 362/543; 362/544; 362/545; 362/546; 362/547; 362/548; 362/640; 362/800
(58) Field of Classification Search ................ 362/249, 362/800, 219, 249.14, 540, 543–545, 546–548, 362/640
See application file for complete search history.

(56) References Cited

U.S. PATENT DOCUMENTS

| | | | |
|---|---|---|---|
| 3,683,101 A * | 8/1972 | Liberman | 174/491 |
| D249,250 S | 9/1978 | Peirish | |
| 4,198,768 A * | 4/1980 | Wahl et al. | 434/224 |
| D291,870 S | 9/1987 | Urbanski et al. | |
| D312,425 S | 11/1990 | Foster | |
| 5,097,397 A * | 3/1992 | Stanuch et al. | 362/493 |
| D326,621 S | 6/1992 | Jincks et al. | |
| D343,817 S | 2/1994 | Morrow | |
| D345,315 S | 3/1994 | Green et al. | |
| D345,316 S | 3/1994 | Green et al. | |
| D347,704 S | 6/1994 | Thompson | |
| D355,142 S | 2/1995 | Wagner | |
| D360,845 S | 8/1995 | Smith | |
| 5,452,188 A | 9/1995 | Green et al. | |
| D363,675 S | 10/1995 | Sasaki et al. | |
| 5,826,965 A | 10/1998 | Lyons | |
| D402,909 S | 12/1998 | Stanuch | |
| 5,884,997 A * | 3/1999 | Stanuch et al. | 362/493 |
| D410,402 S | 6/1999 | Stein et al. | |
| D412,678 S | 8/1999 | Smith et al. | |
| D424,728 S | 5/2000 | Green et al. | |
| 6,081,191 A * | 6/2000 | Green et al. | 340/472 |
| D427,537 S | 7/2000 | Green et al. | |
| D432,038 S | 10/2000 | Sasaki et al. | |
| D432,444 S | 10/2000 | Sasaki et al. | |
| 6,140,918 A | 10/2000 | Green et al. | |
| D442,106 S | 5/2001 | Stein et al. | |
| D460,950 S | 7/2002 | Miller et al. | |
| D469,711 S | 2/2003 | Neufeglise et al. | |
| D476,253 S | 6/2003 | Stein et al. | |

(Continued)

*Primary Examiner*—Sandra L O'Shea
*Assistant Examiner*—Mary Zettl
(74) *Attorney, Agent, or Firm*—Senniger Powers LLP

(57) ABSTRACT

A modular light bar having crisscross lighting in the front and rear. Each module may include two horizontal layers of lighting supported on the underside of a mounting plate and connected to a terminal strip. A quick disconnect connects the terminal strip to a dimmer/flasher and controller.

15 Claims, 10 Drawing Sheets

U.S. PATENT DOCUMENTS

| | | |
|---|---|---|
| D489,466 S | 5/2004 | Kreutzer et al. |
| D492,047 S | 6/2004 | Kreutzer et al. |
| D499,976 S | 12/2004 | Richardson et al. |
| D518,023 S | 3/2006 | Miller |
| D518,400 S | 4/2006 | Sasaki et al. |
| D520,395 S | 5/2006 | Lazalier |
| D529,279 S | 10/2006 | Parks |
| 2003/0025608 A1* | 2/2003 | Pederson ............... 340/815.45 |
| 2003/0043590 A1* | 3/2003 | Walser et al. ............... 362/494 |
| 2004/0120152 A1* | 6/2004 | Bolta et al. ............... 362/294 |

* cited by examiner

MULTI-LEVEL MODULAR LIGHT BAR

FIELD OF THE INVENTION

The present invention generally relates to emergency vehicle lighting and, in particular, to a light bar for a vehicle. In particular, the invention relates to a light bar having light modules mounted in modular enclosures supported by a base. Each light module may have multiple levels of light sources.

BACKGROUND OF THE INVENTION

Emergency lighting on police or other public service vehicles has been used for many years. Generally, such lighting is mounted on the exterior (usually the roof) of the vehicle in order to provide high visibility to nearby motorists and pedestrians. Exterior mounting also minimizes the possibility that the light produced by the lighting system will adversely affect the vision of someone in the vehicle.

Light bars are generally the most desirable type of emergency exterior lighting because of their ability to provide a wide variety of types of illumination. Typically, the light bar is a unitary rectangular unit which spans the top of the vehicle and is supported by brackets attached to the vehicle. It is desirable that the light bar produce an intense light for maximum visibility.

Prior non-modular light bars have had predetermined lengths (the length of the bar generally corresponding to a width of a vehicle to which the bar is mounted). In order to size light bars for vehicles of different width and for various applications, non-modular light bars of varying length were manufactured which in turn required molds of varying size, one for each length manufactured. Frequently, each length accommodated a different number of light sources so the light source configuration was uniquely customized for each length. In addition, since prior light bars were non-modular structures, maintenance usually required that the entire light bar would have to be disassembled and reassembled.

Prior modular light bars have had modules of predetermined lengths but these lengths have been rather large so that only a few incremental sizes of such modular bars have been available. Sometimes modules of varying length were manufactured which in turn required molds of varying size, one for each length manufactured. Frequently, each module accommodated a different number of light sources so the light source configuration was uniquely customized for each module.

There is a need for a light bar configuration having varying width and having selectable light sources of differing types which can be positioned at various places within the light bar. There is also a need for a light bar having modules which can be assembled without the need for a uniquely customized light source configuration. There is also a need for a light bar having modules of smaller size, each of which can be maintained without the need for disassembling and reassembling a large portion or several modules of the entire light bar.

SUMMARY OF THE INVENTION

According to one embodiment of the invention, a modular light bar has crisscross lighting in the front and rear. According to another embodiment of the invention, each module may include two horizontal layers of lighting supported on the underside of a mounting plate and connected to a terminal strip. According to another embodiment of the invention, a quick disconnect connects the terminal strip to a dimmer/flasher and controller.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Figure 1:
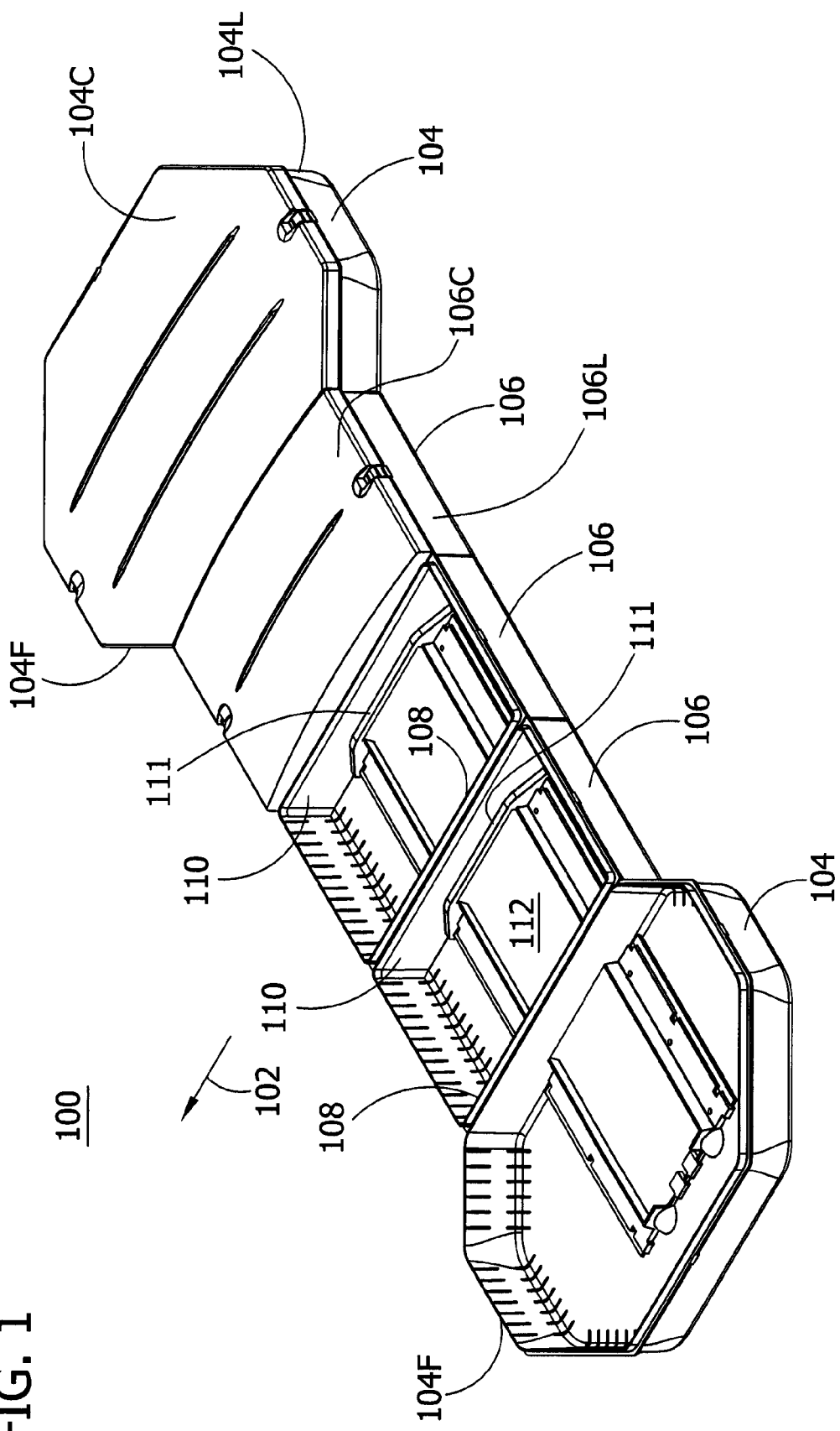
FIG. 1 is a perspective view, partially broken away, showing one embodiment of a light bar of the invention.

FIG. 1 is a perspective view, partially broken away, showing one embodiment of a light bar 100 of the invention. The light bar 100 is used to generate emergency lighting and is usually mounted on a vehicle. For convenience, an arrow 102 indicates the direction of forward travel of the vehicle. The light bar 100 includes a left end module 104 and a right end module 104 which are connected to one or more interior modules 106. Each end module has a lower section 104L and an upper section 104C (e.g., a cover) connected to the lower section 104L. As an example and not by way of limitation, three interior modules 106 are shown in FIG. 1. In general, the number of interior modules is variable, depending in part on the width of the vehicle on which the light bar 100 is mounted and depending on the desires of the user/purchaser of the light bar 100.

In one embodiment, each interior module is approximately 7.5" by 12" in overall dimensions and each end module 104 is approximately 12" by 18" in overall dimensions. This embodiment has dimensions which are compatible with the size of most vehicles and provides more flexibility as compared to the larger modules of the prior art. Also, this embodiment minimizes the need for a third module such as a speaker module or spacer module in order to achieve various lengths for the overall light bar.

Each interior module 106 has a first left side 108 connected to a right side of the left end module 102 and also connected to a right side 110 of another interior module 106. Thus, each interior module 106 also has a second right side 110 opposite the first left side 108 connected to a left side of the right end module 104 and connected to the left side 108 of another interior module 106. For example, in one embodiment a separate bridge element 111 may be positioned between adjacent interior modules 106 so that the modules would be indirectly connected to each other via the bridge element 111. Each module 106 would have an opening in its side 108, 110 for connected to the bridge element 111. In this embodiment, it is also contemplated that each end module 104 may have an opening (not shown) in its side for connected to the bridge element. Alternatively, the end module 104 may have an integral bridge element (not shown) on its side for connecting to the opening in the side of the interior module 106 adjacent thereto. In one embodiment, the end modules 104 have at least eight sides and have a length measured along the direction of travel 102 which is greater than the length of the interior modules 106. Thus, in one embodiment, both the end and interior modules properly mate to each other via an integral or separate bridge, a right side of the left end module 104 being substantially the same size (e.g., length and height) as the first side 108 of the interior module 106.

Each interior module 106 has a lower section 106L and an upper section 106C (e.g., a cover) connected to the lower section 106L.

A longitudinal base 112 such as an extruded aluminum rail is connected to the lower section 104L of the end module 104 (e.g., via sheet metal screws, not shown) and the lower section 106L of the interior module 106 (e.g., via sheet metal screws, not shown) for supporting the end and interior modules side by side. The base 112, the lower section of each end module 104L mounted on the base 112 and the corresponding upper section 104C of each end module (connected to the lower section) together form an enclosure. Similarly, the base 112, the lower section of each interior module 106L mounted on the base 112 and the corresponding upper section 106C of each interior module (connected to the lower section) together form an enclosure. In the embodiment illustrated, each interior module 106 has four sides forming a rectangular horizontal cross section and the left and right end modules 104 have substantially the same horizontal cross section and the interior modules 106 have substantially the same rectangular horizontal cross section.

Figure 4:
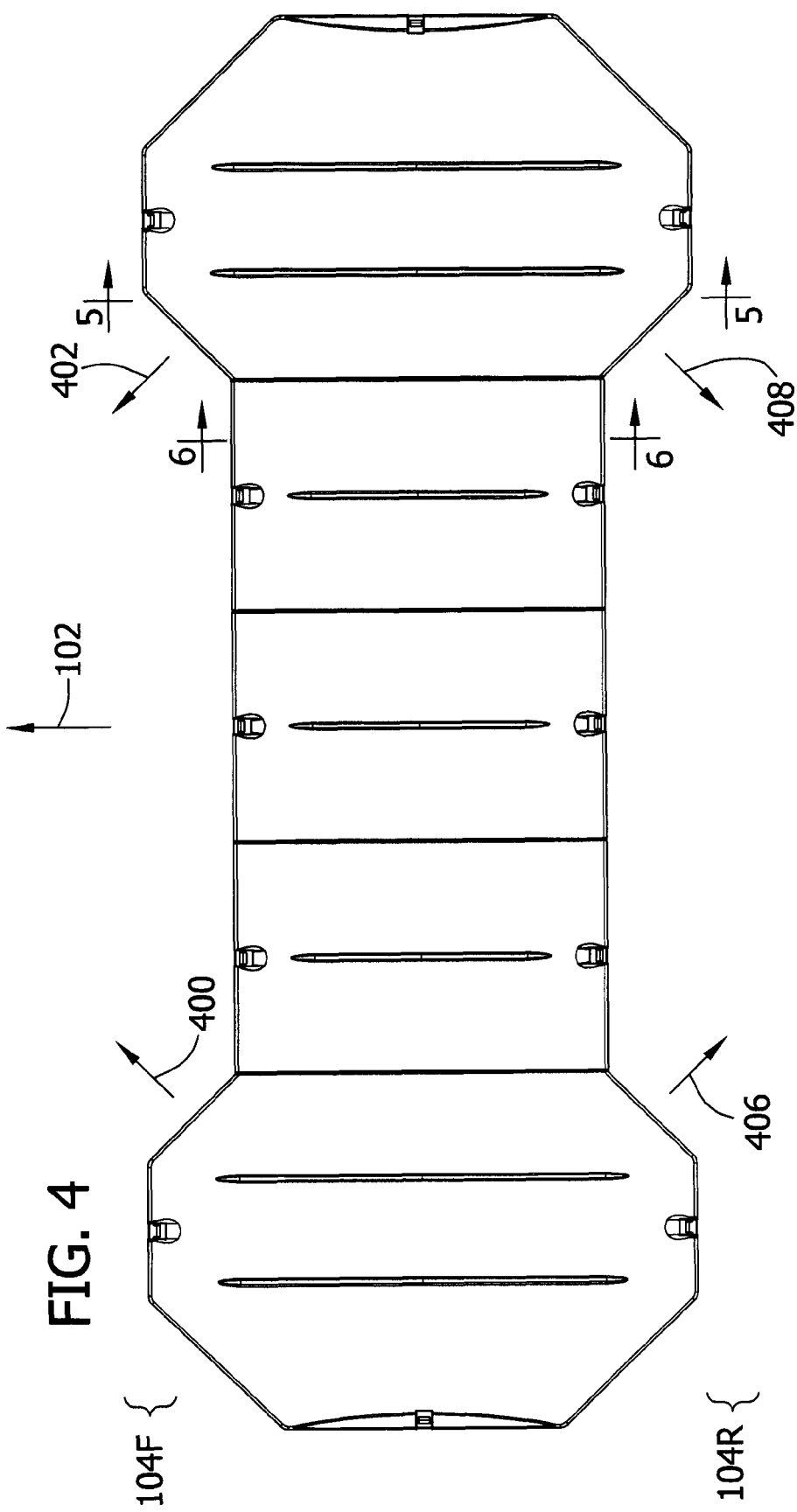
FIG. 4 is a top plan view showing one embodiment of a light bar of the invention have two octagonal end modules interconnected by three rectangular interior modules.

FIG. 4 is a top plan view showing one embodiment of a light bar of the invention have two octagonal end modules interconnected by three rectangular interior modules. As shown in FIGS. 1 and 4, the left and right end modules 104 each have a front portion 104F extending forward of the interior modules 106 so that light as indicated by arrow 400 emitted by the front portion of the left end module is directed toward the front portion of the right end module and visa versa (light as indicated by arrow 402 emitted by the front portion of the right end module is directed toward the front portion of the left end module). In addition, the left and right end modules 104 each have a rear portion 104F extending rearward of the interior modules 106 so that light as indicated by arrow 406 emitted by the rear portion of the left end module is directed toward the rear portion of the right end module and visa versa (light as indicated by arrow 408 emitted by the rear portion of the right end module is directed toward the rear portion of the left end module). As a result, light from the left end module crisscrosses with light from the right end module in both the front and rear of the light bar 100.

Figure 2:
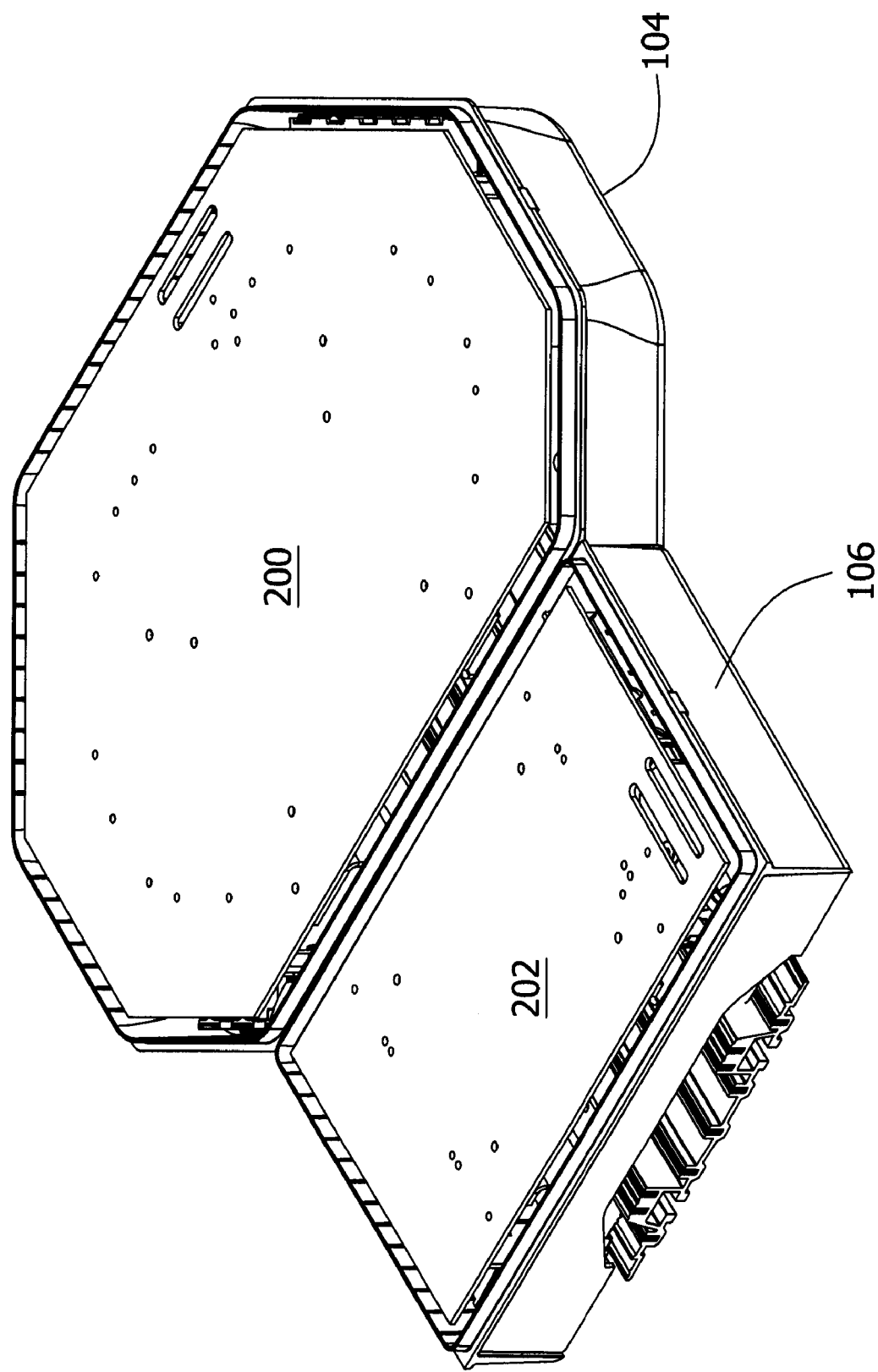
FIG. 2 is perspective view showing one embodiment of a light bar of the invention in which an octagonal end module is mated to a rectangular interior module with covers removed to illustrate the mounting plate.

FIG. 2 is perspective view showing one embodiment of the light bar 100 of the invention in which the octagonal end module 104 is mated to the rectangular interior module 106, each having their upper sections 104C, 106C removed to illustrate a mounting plate 200, 202. In particular, each end module 104 includes an octagonal mounting plate 200 which is supported by and attached to the base 112, such as by screws (not shown). Also, each interior module 106 includes a rectangular mounting plate 202 which is supported by and attached to the base 112, such as by screws (not shown).

Figure 3:
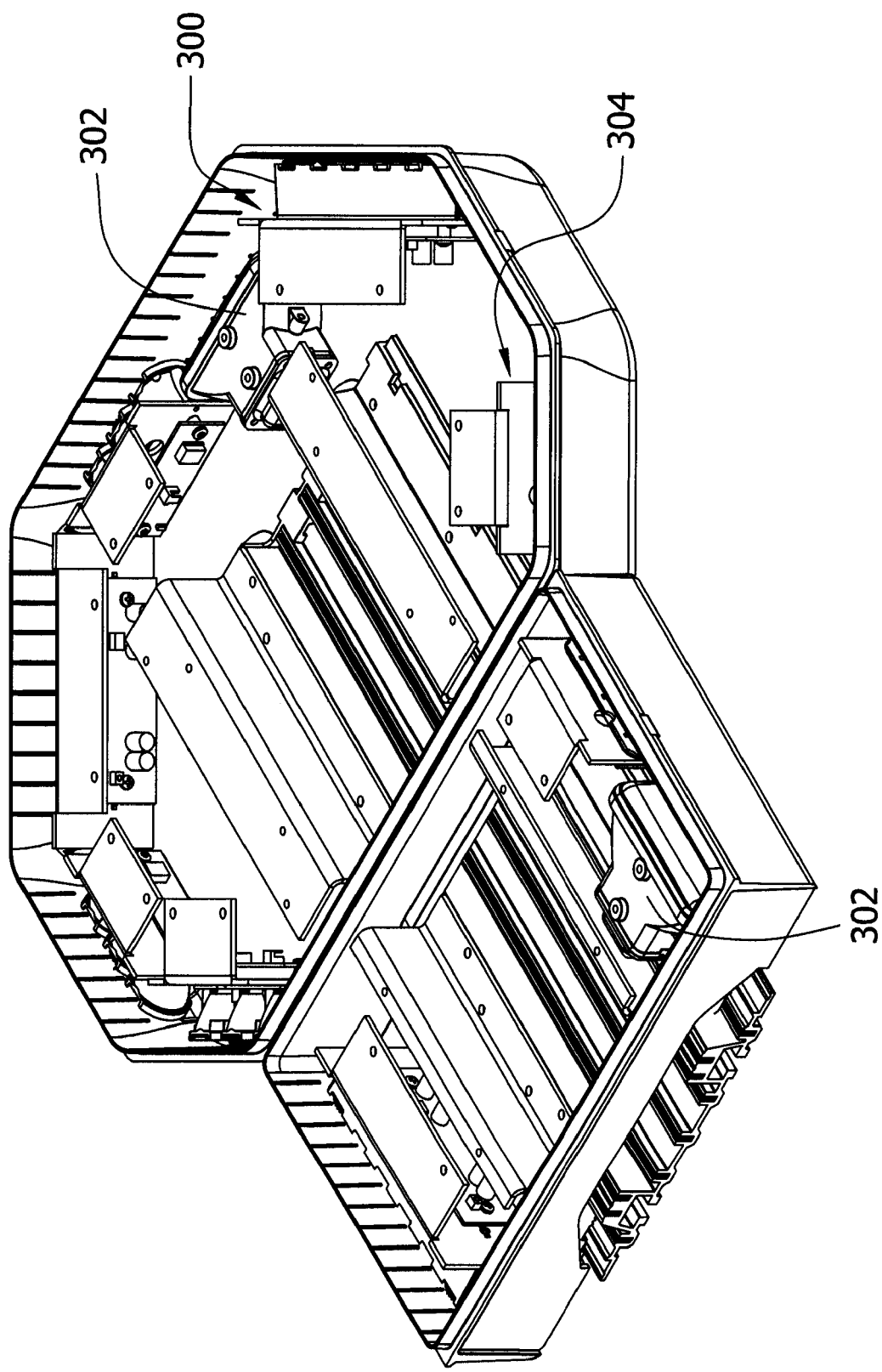
FIG. 3 is similar to FIG. 2 without the mounting plate to illustrate the position of the light modules when supported by the mounting plate.
Figure 7:
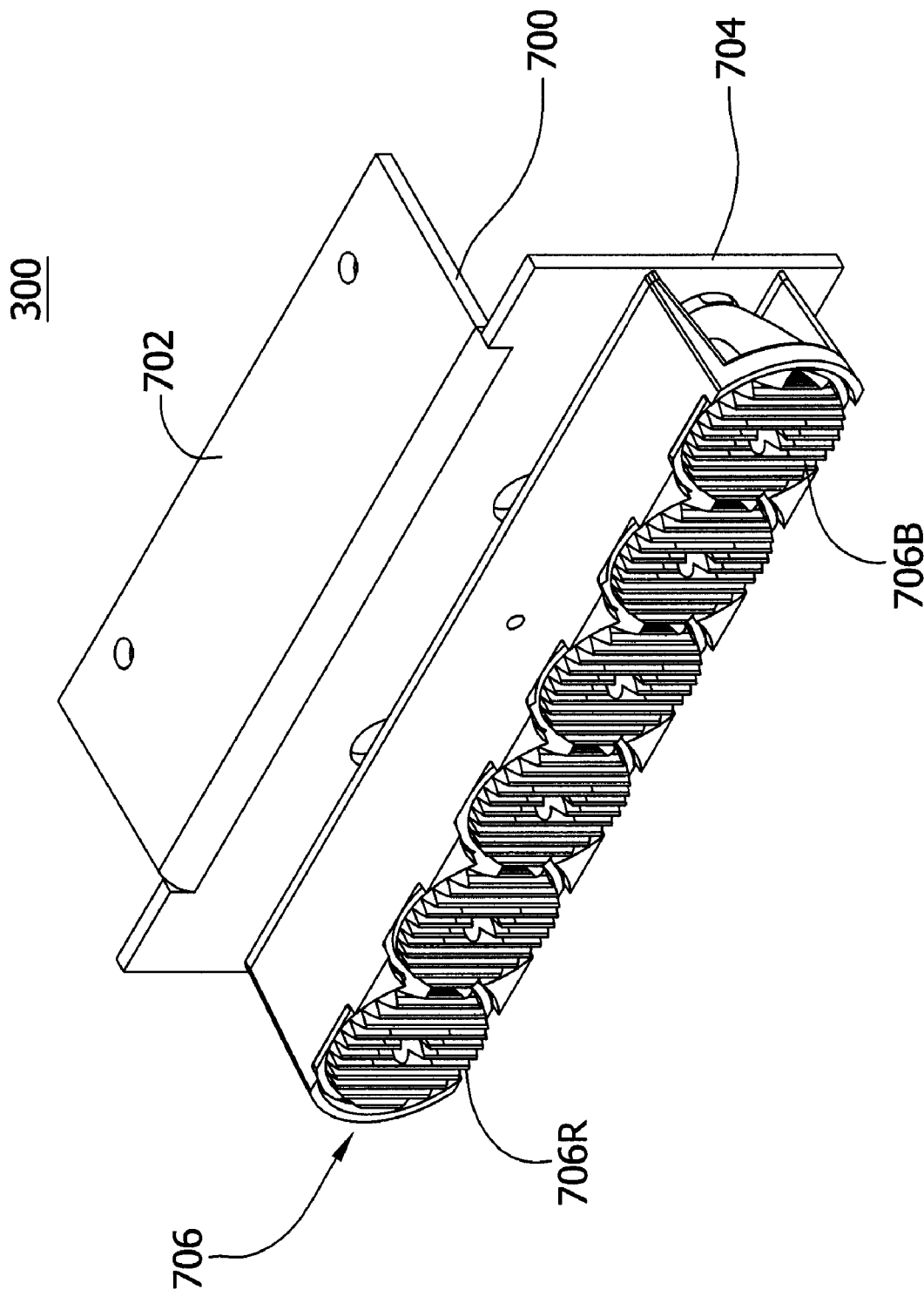
FIG. 7 is a perspective view of an LED light module according to one embodiment of the invention.
Figure 10:
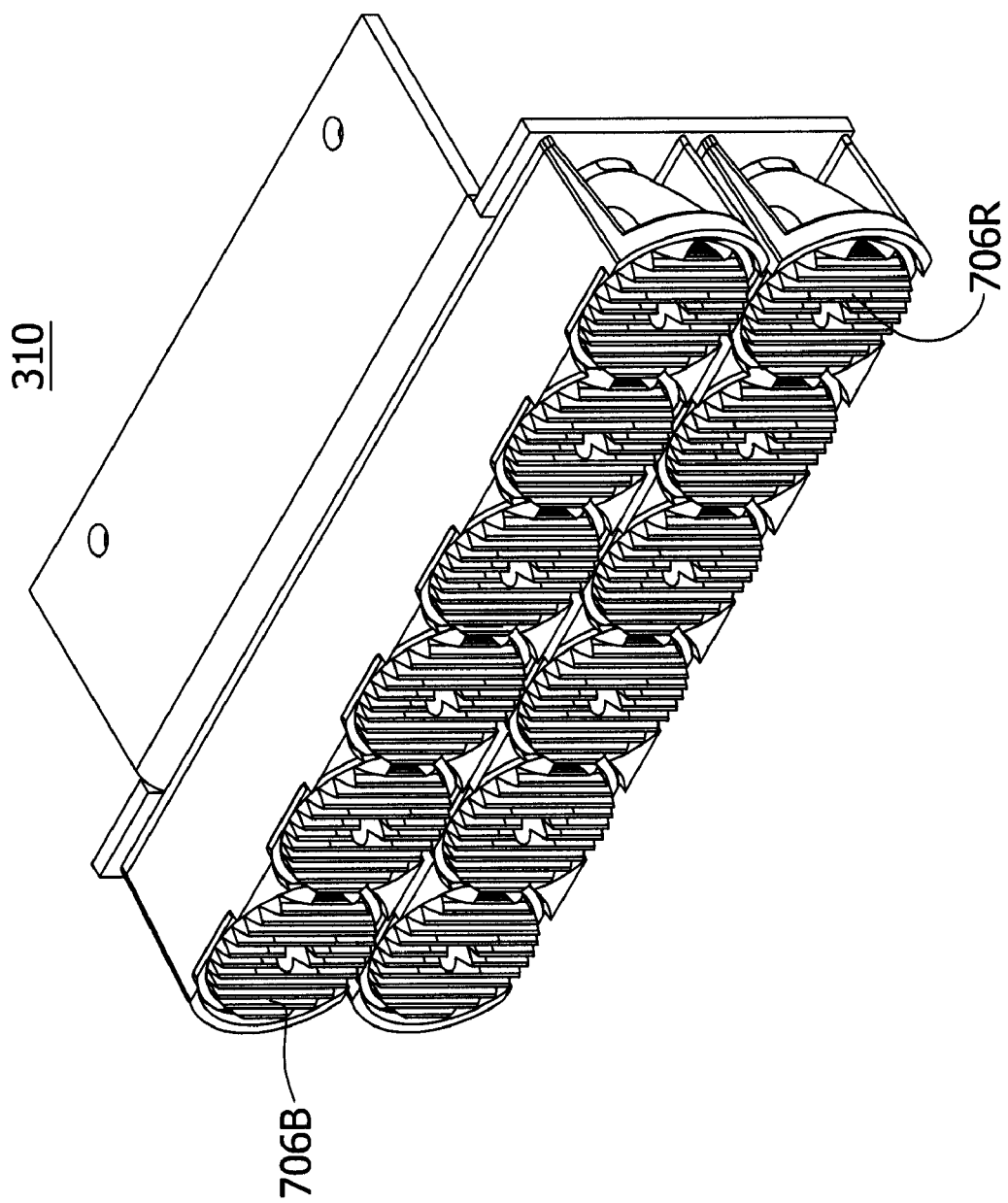
FIG. 10 is a perspective view of an LED light module according to one embodiment of the invention having two horizontal rows.

One purpose of the mounting plates 200, 202 is to support modular light sources 300, 302, 304. FIG. 3 is similar to FIG. 2 without the mounting plates 200, 202 to illustrate exemplary positions of the light modules 300, 302, 304 when supported by the mounting plate (not shown in FIG. 3). FIG. 7 is a perspective view of a six (6) LED light module 300 according to one embodiment of the invention. As illustrated in FIG. 7, each LED is positioned at or near a focal point of a TIR reflector and is covered by a columnating lens which directs the light in a beam or a wide angle lens which disperses the light in a wide angle. FIG. 10 is a perspective view of a twelve (12) LED light module 310 according to one embodiment of the invention. The light source 302 is a unitary light fixture. The light source 304 is similar to the light source 300 except that it has three instead of six LEDs.

The light source module 300 includes a bracket 700 having a horizontal leg 702 and a vertical leg 704. The horizontal leg 702 is connected to an underside of the mounting plate 200, such as by screws (not shown). The vertical leg 704 supports at least two (and preferably three or six) of a plurality of light emitting elements such as light emitting diodes (LED) 706. In one embodiment, as shown in FIG. 10, a light module may include two horizontal rows. Thus, FIG. 10 illustrates a light source module 310 having a light source bracket and a plurality of 12 light emitting elements on the light source support forming at least two different horizontal levels of lighting.

In one embodiment, the brackets 700 are connected to and support the LEDs such that heat generated by the LEDs to transferred to the brackets 700. In addition, the brackets are in heat exchange relationship with the mounting plate 200 so that heat absorbed by the brackets is transferred to the mounting plate. Thus, heat from the LEDs is transferred to the brackets and heat absorbed by the brackets from the LEDs is transferred to the mounting plate.

In one embodiment, it is contemplated that the light module 300 as shown FIG. 7 or the light module 310 as shown in FIG. 10 may include at least one red LED 706R and at least one blue LED 706B which may be simultaneously energized by a controller. In one embodiment, each row of modules 300 and 310 would have three (3) red LEDs contiguous to each other and three (3) blue LEDs contiguous to each other. In another embodiment, the red and blue LEDs would alternate with each other so that a row would be red, blue, red, blue, red and blue. In yet another embodiment of the module 310, one row would be red and one row would be blue. Other alternative patterns will be apparent to those skilled in the art. Generally, it is contemplated that the number of red LEDs equal the number of blue LEDs. However, certain red LEDs may have more intensity than certain blue LEDs so that more blue LEDs than red LEDs may be used, and visa versa. In each embodiment, the one or more red LEDs 706R and the one or more blue LEDs 706B when simultaneously energized would generate light which appears to be white light to an remote observer (not shown).

Figure 5:
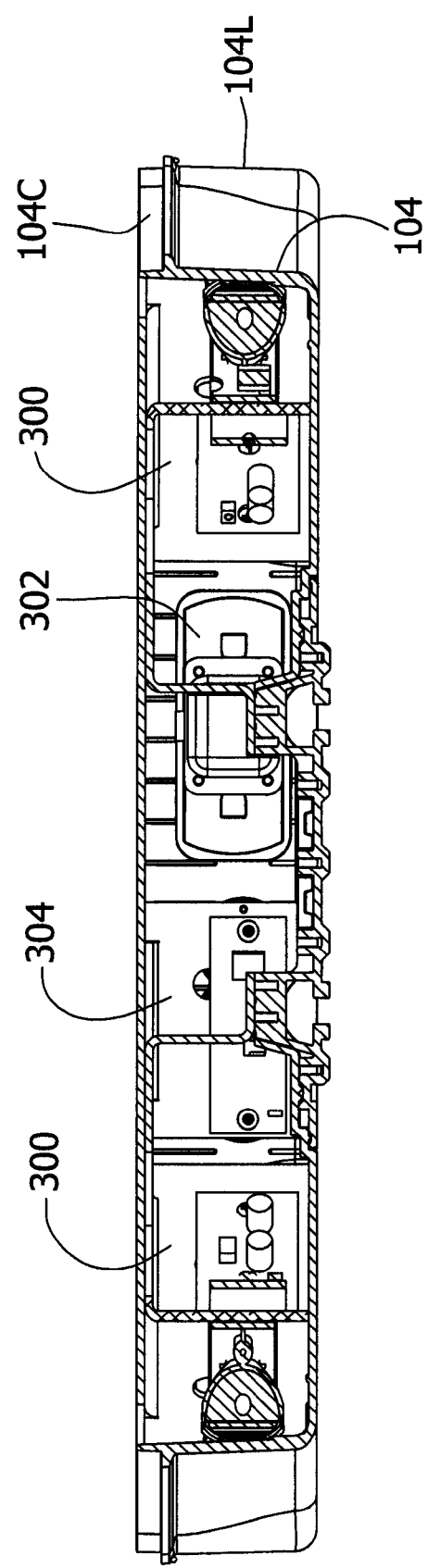
FIG. 5 is a cross sectional view taken along lines 5-5 of FIG. 4.
Figure 6:
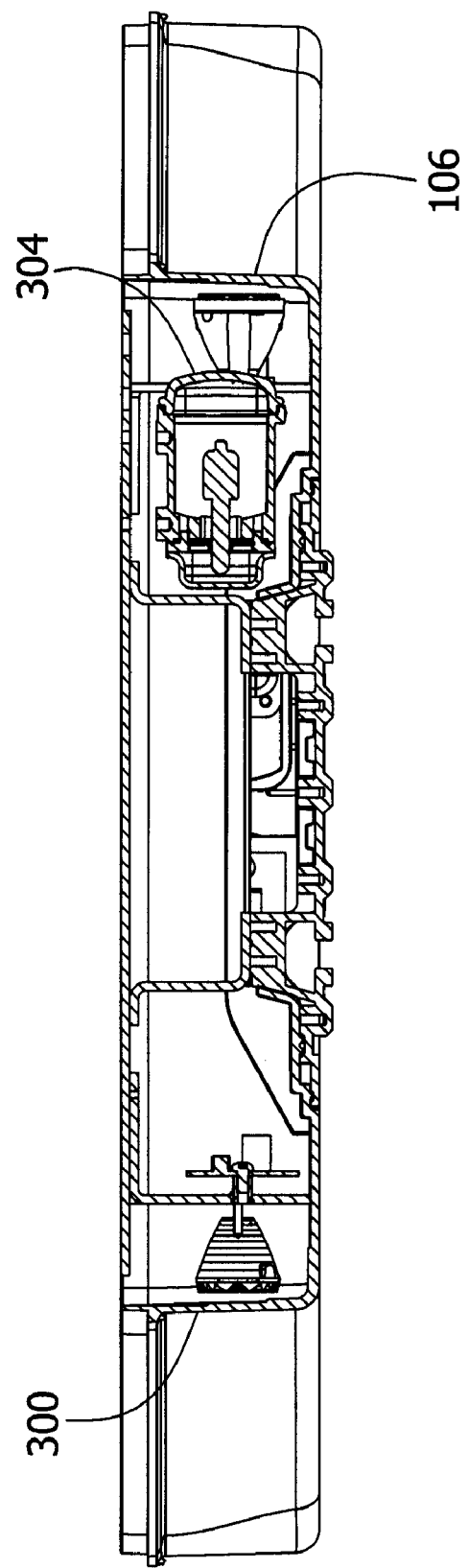
FIG. 6 is a cross sectional view taken along lines 6-6 of FIG. 4.

FIG. 5 is a cross sectional view taken along lines 5-5 of FIG. 4 illustrating the light modules 300, 302 and 304 within the end module 104. FIG. 6 is a cross sectional view taken along lines 6-6 of FIG. 4 illustrating the light modules 300 and 304 within the interior module 106.

Figure 8:
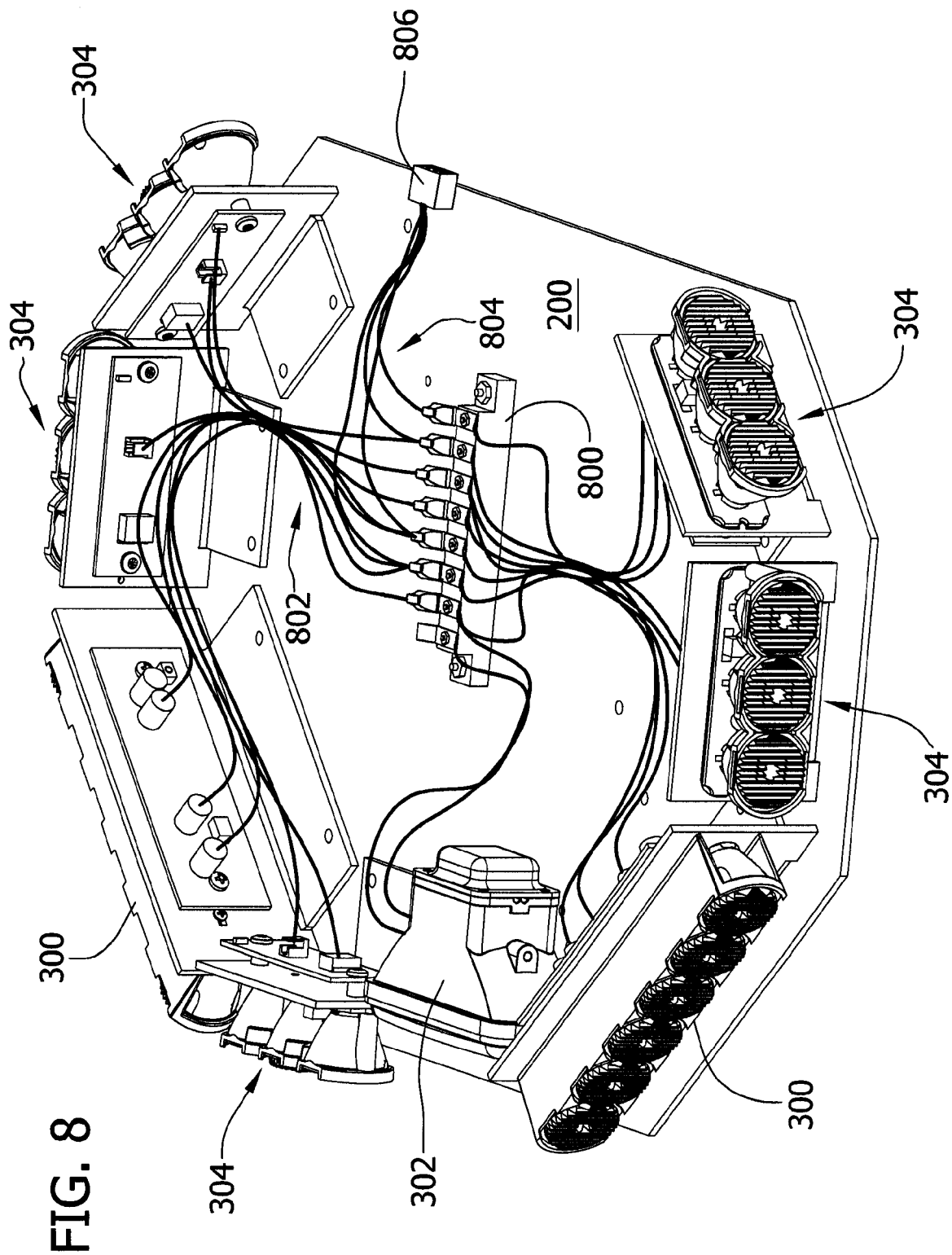
FIG. 8 is a perspective view of a mounting plate for an octagonal end module which has be rotated 180° to illustrate the light modules and terminal strip mounted thereto, according to one embodiment of the invention.

FIG. 8 is a perspective view of a mounting plate for an octagonal end module which has be rotated 180° to illustrate the light modules and terminal strip mounted thereto, according to one embodiment of the invention. (terminal strip; FIG. 8) In one embodiment, a terminal strip 800 is positioned on each mounting plate 200, 202. The plurality of light emitting diodes on the brackets on each particular mounting plate are electrically connected by wires 802 to the terminal strip 800. In addition, a wire harness connects the terminal strip 800 to the controller to selectively energize each of the plurality of light emitting diodes.

In one embodiment, it is contemplated that the controller would be positioned within one of the modules and connected to the light sources via the harness connected to the terminal strips 800. Thus, the controller selectively energizes the light sources to generate one or more emergency warning signals. Preferably, the wire harness may be positioned within a channel in the base 112 so that one end of the harness is connected to the light sources via the terminal strip 800 and the another end of the harness is connected to the controller. As shown in FIG. 8, the harness would include a quick disconnect 806 between each module and the controller. Thus, if a mounting plate of a particular module needs to be removed from the light bar 100 for repair or revision, the quick disconnect 806 allows the mounting plate to be disconnected and replaced without the need to open or access any other modules other than the particular module.

Figure 9:
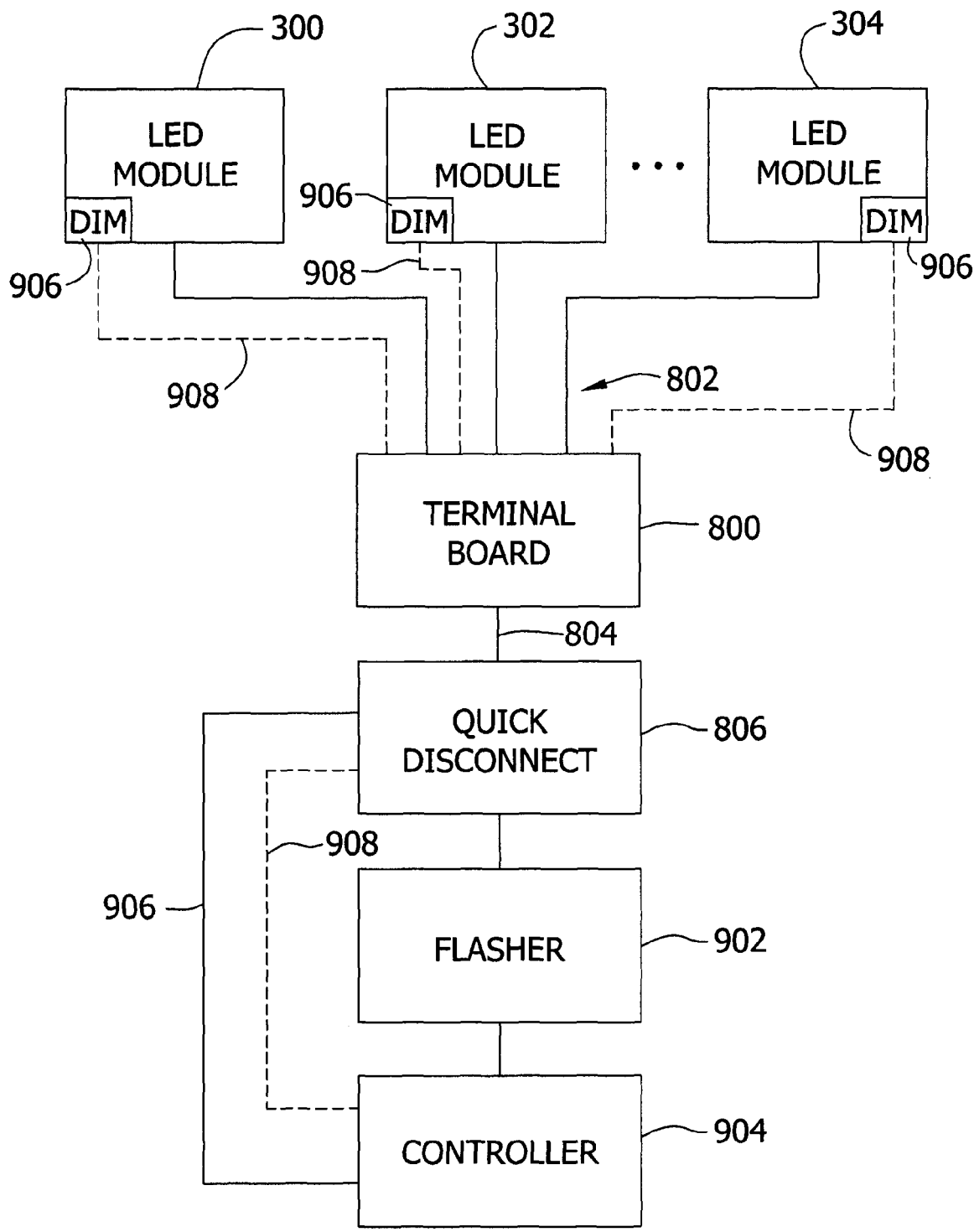
FIG. 9 is a block diagram of one embodiment of a wiring configuration according to the invention.

FIG. 9 is a block diagram of one embodiment of a wiring configuration according to the invention. In one embodiment, it is contemplated that a multiple of the light sources of the modules 300, 302, 304 are connected to a common circuit via the terminal strip 800, the harness 804 and the quick disconnect 806. In one embodiment, each LED module 300, 302, 304 would have its own dimmer circuit 906 and a control lead 908 from each dimmer circuit 906 would be connected to the terminal strip 800. The dimmer circuits could be optionally used in this embodiment. For example, the dimmer circuit would be connected to controller via the terminal strip 800 and the quick disconnect 806 when the ability to dim the LEDs is desired. Alternatively, there may be various types of controllers and the dimmer circuit would only be connected to certain controllers. As another alternative, it may be desirable that only certain modules are dimmed, in which case only those dimmer circuits of the modules to be dimmed would have their control lead 908 connected to the controller via the terminal strip 800 and quick disconnect 806.

The common circuit is then connected to a flashing circuit 902 responsive to a controller 904 for simultaneously flashing the multiple of light emitting diodes. A remainder of the harness 906 including the dimmer control 908 (if it will be used) is directly connected to the controller 904 so that the controller selectively energizes the light sources. As shown in FIG. 9, the flasher 902 is illustrated as a separate component. However, it is also contemplated that the flashing function may be integral with the controller. In this case, the controller 904 would have certain ports which are connected to the common circuit to flash its sources wherein the controller 904 would have other ports which would selectively energize the light sources connected thereto.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A light bar for use on a vehicle having a width, said light bar comprising:

Left and right end light bar modules, each said end light bar module having a lower section and an upper section connected to the lower section;

A left interior light bar module having a left side and a right side, the left side connected to the left end light bar module;

A right interior light bar module having a left side and a right side, the right side connected to the right end light bar module;

At least one center interior light bar module having one side connected the right side of the left light bar module and having another side connected to the left side of the right light bar module, wherein the number of center interior light bar modules determines a length of the overall light bar so that the length of the overall light bar corresponds to the width of the vehicle;

a plurality of mounting plates, at least one mounting plate positioned within and connected to each of the light bar modules;

A longitudinal base connected to each of the mounting plates, said base supporting the end and interior light bar modules side by side, said base having a longitudinal channel within each of the modules;

A plurality of light sources, at least one light source positioned within each light bar module and on the mounting plate within said light bar module;

A plurality of terminal strips, one for positioned within each light bar module and connected to the light sources of the light bar module;

A plurality of quick disconnects, one positioned within each light bar module and connected to each of the terminal strips;

A controller for selectively energizing the light sources to generate an emergency warning signal; and A wire harness positioned within the longitudinal channel in the longitudinal base having one end connected to the plurality of quick disconnects within the modules and having another end connected to the controller;

wherein each of the light bar modules is serviceable independent of the other light bar modules, such that the mounting plate positioned within and connected to the light bar module being serviced is removable from each light bar module without accessing the other light bar modules by disconnecting the wire harness from the quick disconnect connected to the terminal strip positioned within the light bar module being serviced.

2. The light bar of claim 1 wherein the base, lower section of each module mounted on the base and the upper section of each module form an enclosure.

3. The light bar of claim 1 wherein the end modules have at least eight sides and have a dimension greater than a corresponding dimension of the interior modules, wherein the dimension of each module is measured along the direction of travel of the vehicle, wherein one side of the left end module is substantially the same size as the left side of the left interior module and wherein one side of the right end module is substantially the same size as the right side of the right interior module.

4. The light bar of claim 1 wherein each interior module has four sides forming a rectangular horizontal cross section.

5. The light bar of claim 1 wherein the left and right end modules have substantially the same horizontal cross section and the left interior module, the right interior module, and at least one center interior module have a substantially rectangular horizontal cross section.

6. The light bar of claim 1 wherein each light source comprises a light source module having a light source support and a plurality of light emitting elements on the light source support forming at least two different horizontal levels of lighting.

7. The light bar of claim 6, wherein each said mounting plate is connected to the longitudinal base and wherein each light source support comprises a bracket having one leg on which at least two of the plurality of light emitting elements are mounted and having another leg connected to an underside of the mounting plate.

8. The light bar of claim 7 wherein the brackets are connected to light emitting diodes and the mounting plate such that heat from the light emitting diodes is transferred to the brackets and heat absorbed by the brackets from the light emitting diodes is transferred to the mounting plate.

9. The light bar of claim 7 further comprising at least one of the terminal strips on each mounting plate and wherein the plurality of light emitting diodes on brackets on each particular plate are connected to the terminal strip on the particular plate and wherein the wire harness is connected to terminal strip for selectively energizing each of the plurality of light emitting diodes.

10. The light bar of claim 7 wherein each module has a dimming circuit, wherein a multiple of the light emitting diodes of each module are connected to the dimming circuit of its module and wherein the dimming circuits are responsive to the controller for simultaneously dimming the multiple of light emitting diodes.

11. The light bar of claim 10 wherein a multiple of the light emitting diodes of multiple modules are connected to a common circuit and wherein the common circuit is connected to a flashing circuit responsive to the controller for simultaneously flashing the multiple of light emitting diodes.

12. The light bar of claim 7 wherein at least one module includes a red LED and a blue LED and wherein the controller simultaneously energizes the red LED and the blue LED of said one module to generate light which appears to be white light to an remote observer.

13. The light bar of claim 7 wherein the light emitting elements are LEDs.

14. The light bar of claim 1, wherein the left and right end modules have a front portion extending forward of the interior module so that light emitted by the front portion of the left end module is directed toward the front portion of the right end module and visa versa, and wherein the left and right end modules have a rear portion extending rearward of the interior module so that light emitted by the rear portion of the left end module is directed toward the rear portion of the right end module and visa versa.

15. The light bar of claim 1, further comprising a plurality of light source modules, at least one light source module positioned within each of the light bar modules, each light source module having at least two vertically spaced substantially horizontal rows of LED light sources.

\* \* \* \* \*